(12) United States Patent
Kim et al.

(10) Patent No.: US 11,318,863 B2
(45) Date of Patent: May 3, 2022

(54) VEHICLE SEAT

(71) Applicant: NHK SPRING CO., LTD., Yokohama (JP)

(72) Inventors: Donghyoun Kim, Yokohama (JP); Katsutoshi Imanari, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 17/090,174

(22) Filed: Nov. 5, 2020

(65) Prior Publication Data

US 2021/0138932 A1 May 13, 2021

(30) Foreign Application Priority Data

Nov. 11, 2019 (JP) .............................. JP2019-204263

(51) Int. Cl.
*B60N 2/66* (2006.01)
*B60N 2/00* (2006.01)
*B60N 2/02* (2006.01)

(52) U.S. Cl.
CPC ........... *B60N 2/002* (2013.01); *B60N 2/0244* (2013.01); *B60N 2/66* (2013.01); *B60N 2/666* (2015.04); *B60N 2002/0268* (2013.01)

(58) Field of Classification Search
CPC ... B60N 2/66; B60N 2002/0268; B60N 2/002
See application file for complete search history.

(56) References Cited

U.S. PATENT DOCUMENTS

| | | | |
|---|---|---|---|
| 10,945,528 B1* | 3/2021 | Park | A47C 7/024 |
| 2018/0022246 A1* | 1/2018 | Patrick | B60N 2/0232 |
| | | | 297/284.3 |
| 2018/0304774 A1* | 10/2018 | Mizoi | A61B 5/18 |
| 2019/0248260 A1* | 8/2019 | Yoshikawa | B60N 2/2222 |
| 2019/0337412 A1* | 11/2019 | Zouzal | B60N 2/665 |
| 2020/0130551 A1* | 4/2020 | Mizoi | A61H 7/007 |
| 2021/0039527 A1* | 2/2021 | Masuda | B60N 2/976 |
| 2021/0213853 A1* | 7/2021 | Balde | B60R 21/01516 |

FOREIGN PATENT DOCUMENTS

| | | | | |
|---|---|---|---|---|
| EP | 3059116 A1 * | 8/2016 | ............. | B60N 2/797 |
| JP | A H08-056776 | 3/1996 | | |
| JP | 2019131049 A * | 8/2019 | | |
| WO | WO-2021002177 A1 * | 1/2021 | ............... | A47C 7/62 |

* cited by examiner

Primary Examiner — Timothy J Brindley
(74) Attorney, Agent, or Firm — Dority & Manning, P.A.

(57) ABSTRACT

A vehicle seat including: a seat body configured to seat an occupant; a pressing mechanism that is provided at the seat body and is switchable between a pressing state, in which the pressing mechanism presses against the pelvis of a seated occupant, and a non-pressing state, in which the pressing mechanism does not press against the pelvis of a seated occupant; and a control section configured to control the pressing mechanism, in a state in which an occupant is sitting on the seat body, so as to alternate repeatedly between the pressing state and the non-pressing state.

2 Claims, 19 Drawing Sheets

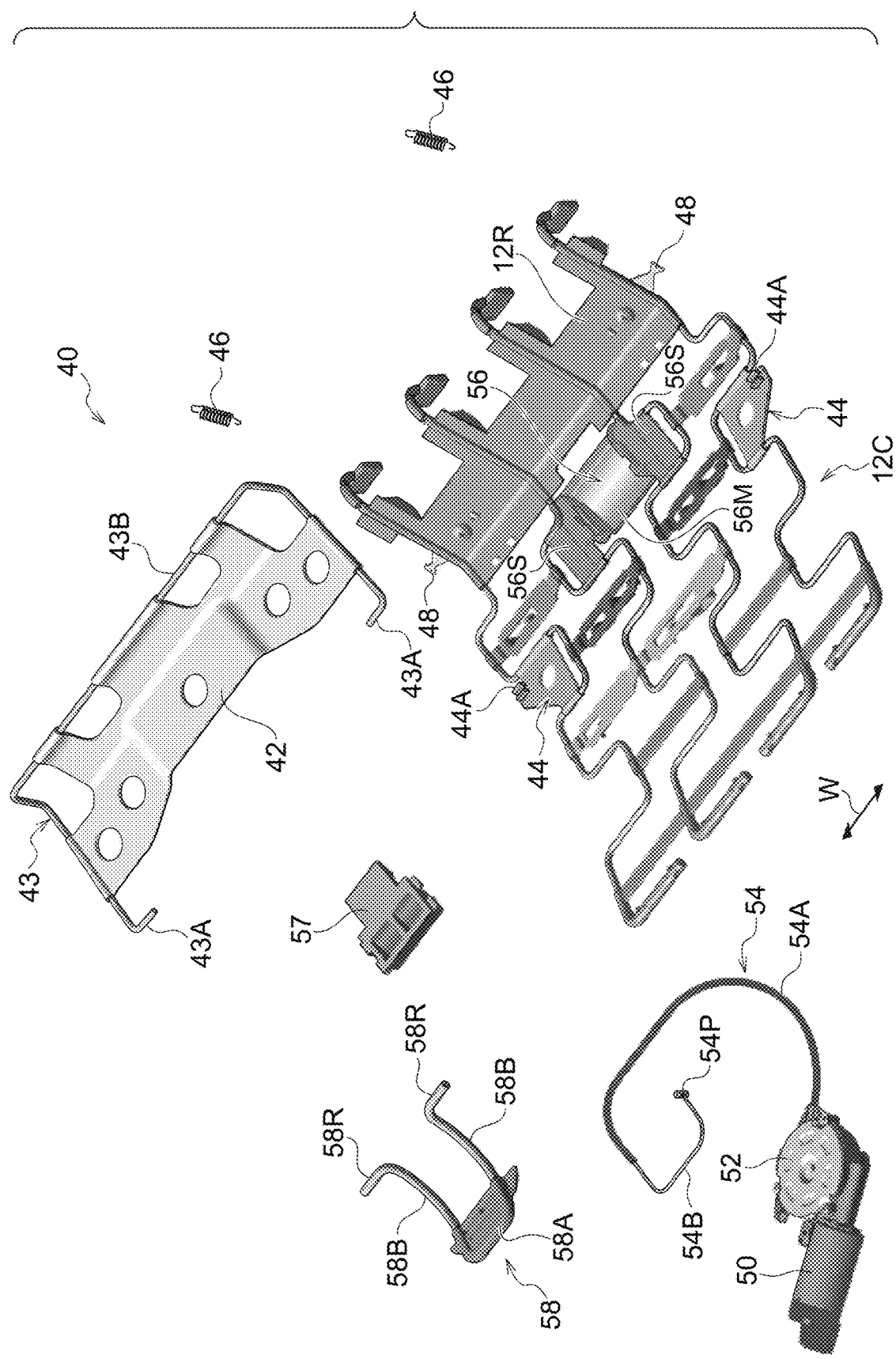

FIG.10

VEHICLE SEAT

CROSS-REFERENCE TO RELATED APPLICATION

This application is based on and claims priority under 35 USC 119 from Japanese Patent Application No. 2019-204263 filed on Nov. 11, 2019, the disclosure of which is incorporated by reference herein.

BACKGROUND

Technical Field

The present disclosure relates to a vehicle seat.

Related Art

Technology relating to vehicle seats with a pelvis-supporting function is known (see, for example, Japanese Patent Application Laid-Open (JP-A) No. H08-56776). This related technology is able to contribute to alleviating fatigue when seated.

However, in such related technology, the fatigue alleviation effect is greatly reduced if the duration spent seated in a pelvis-supported posture exceeds a certain amount of time. There is therefore room for improvement in this regard.

SUMMARY

In consideration of the above circumstances, an object of the present disclosure is to obtain a vehicle seat capable of suppressing a reduction in a fatigue alleviation effect, even when remaining seated for a long time.

A vehicle seat of a first aspect of the present disclosure includes: a seat body configured to seat an occupant; a pressing mechanism that is provided at the seat body and is switchable between a pressing state, in which the pressing mechanism presses against the pelvis of a seated occupant, and a non-pressing state, in which the pressing mechanism does not press against the pelvis of a seated occupant; and a control section configured to control the pressing mechanism, in a state in which an occupant is sitting on the seat body, so as to alternate repeatedly between the pressing state and the non-pressing state.

In the above configuration, the pressing mechanism provided to the seat body is capable of switching between the pressing state in which the pressing mechanism presses against the pelvis of a seated occupant, and the non-pressing state in which the pressing mechanism does not press against the pelvis of a seated occupant. The control section controls the pressing mechanism in a state in which an occupant is sitting on the seat body so as to alternate repeatedly between the pressing state and the non-pressing state. Note that when the pressing mechanism is switched between the pressing state and the non-pressing state, the body pressure distribution in the vicinity of the pelvis of the seated occupant changes. This suppresses a reduction in the fatigue alleviation effect, even if the seated occupant remains seated for a long time.

A vehicle seat of a second aspect of the present disclosure is the first aspect, wherein the control section is configured to control the pressing mechanism such that a continuation duration of the pressing state initially after an occupant sits down is from 35 minutes to 45 minutes and is longer than a continuation duration of the pressing state from a second time onward after the occupant has sat down.

In the above configuration, the continuation duration of the pressing state initially after an occupant sits down is from 35 minutes to 45 minutes, and is a longer duration than the continuation duration of the pressing state from the second time onward after the occupant has sat down. This configuration enables fatigue to be alleviated initially after the occupant sits down, and also switches from the pressing state to the non-pressing state at a timing shortly before the seated occupant would want the pressing against their pelvis to be relieved. This suppresses a reduction in the fatigue alleviation effect.

A vehicle seat of a third aspect of the present disclosure is the first aspect, wherein the seat body is provided with a body pressure sensor at a location corresponding to a range where the pressing mechanism presses against the pelvis of a seated occupant. The control section is configured to control the pressing mechanism based on a detection result from the body pressure sensor so as to switch at a preset timing between a first state in which a surface area of a location within a detection range of the body pressure sensor where body pressure from a seated occupant acts is a prescribed reference value or greater and a maximum value of the body pressure is no greater than a prescribed value, and a second state that is different to the first state.

In the above configuration, the seat body is provided with the body pressure sensor at a location corresponding to the range where the pressing mechanism presses against the pelvis of a seated occupant. The control section further controls the pressing mechanism based on a detection result from the body pressure sensor so as to switch at the preset timing between the first state in which a surface area of a location within the detection range of the body pressure sensor where the body pressure from the seated occupant acts is the prescribed reference value or greater and the maximum value of the body pressure is no greater than the prescribed value, and the second state that is different to the first state. This prevents the body pressure distribution in the vicinity of the pelvis of the seated occupant from continuing in the same state for too long, and suppresses a reduction in the fatigue alleviation effect.

As described above, the vehicle seat of the present disclosure exhibits an excellent advantageous effect of enabling a reduction in the fatigue alleviation effect to be suppressed, even when remaining seated for a long time.

BRIEF DESCRIPTION OF THE DRAWINGS

Exemplary embodiments of the present disclosure will be described in detail based on the following figures, wherein:

FIG. 9 is an exploded perspective view illustrating part of the framework structure of the seat cushion in FIG. 3;

FIG. 10 is a perspective view illustrating a cushion support in FIG. 3 in a state after actuation as viewed from an oblique upper side:

DETAILED DESCRIPTION

First Exemplary Embodiment

Figure 1:
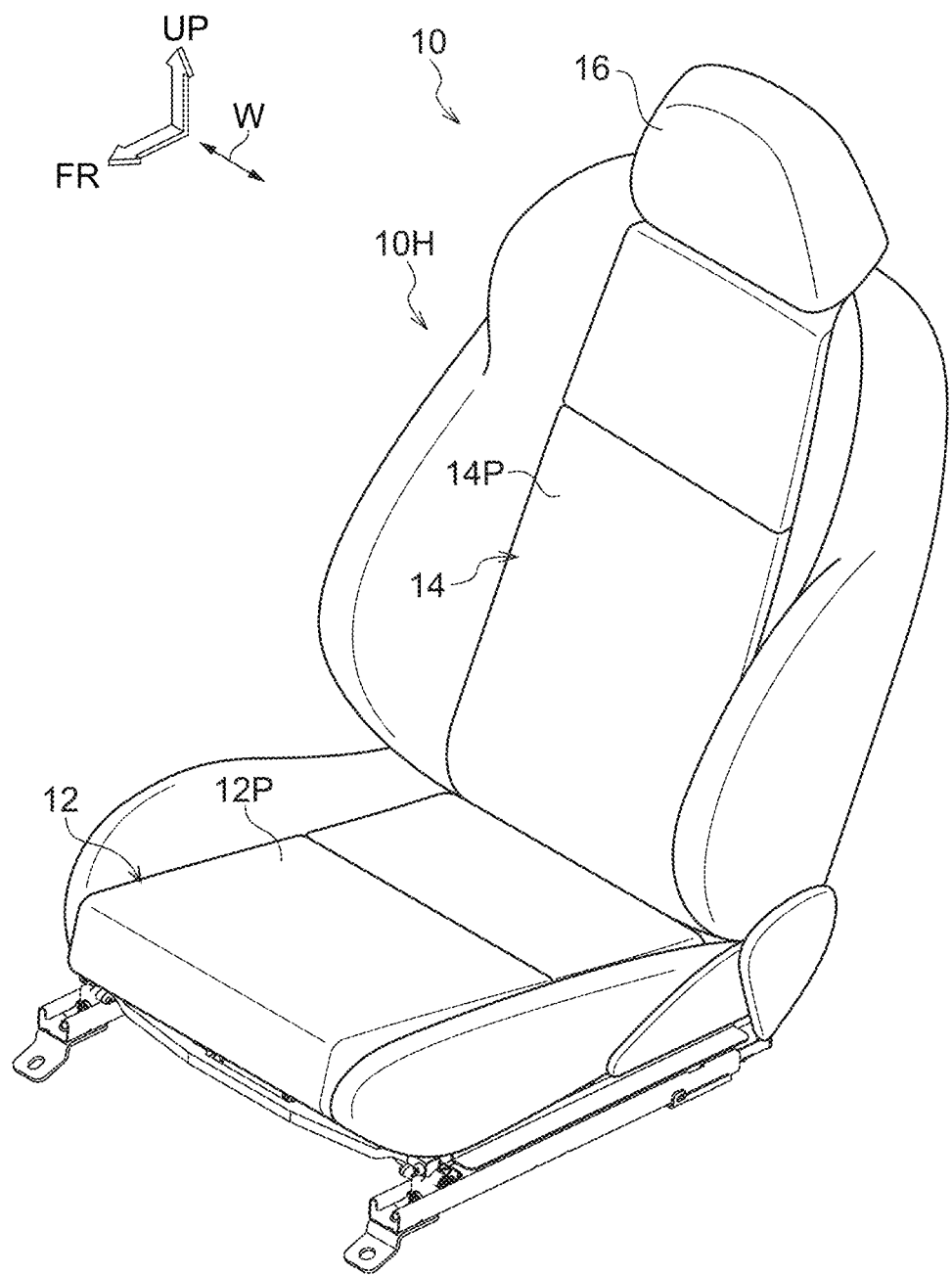
FIG. 1 is a perspective view illustrating a vehicle seat according to a first exemplary embodiment of the present disclosure.

Explanation follows regarding a vehicle seat according to a first exemplary embodiment of the present disclosure, with reference to FIG. 1 to FIG. 18. Note that in the drawings, the arrow FR indicates a seat front side, the arrow UP indicates a seat upper side, and the arrow W indicates a seat width direction, as appropriate.

FIG. 1 is a perspective view illustrating a vehicle seat 10 according to the present exemplary embodiment. The vehicle seat 10 includes a seat body 10H on which an occupant sits. The seat body 10H includes a seat cushion 12 to support the buttocks and thighs of a seated occupant P, a seatback 14 to support the back of the seated occupant P, and a headrest 16 to support the head of the seated occupant P. The seat cushion 12 is configured by covering a seat cushion frame 12F (see FIG. 3) with a seat cushion pad 12P. The seatback 14 is configured by covering a seatback frame 14F (see FIG. 2) with a seatback pad 14P.

Figure 2:
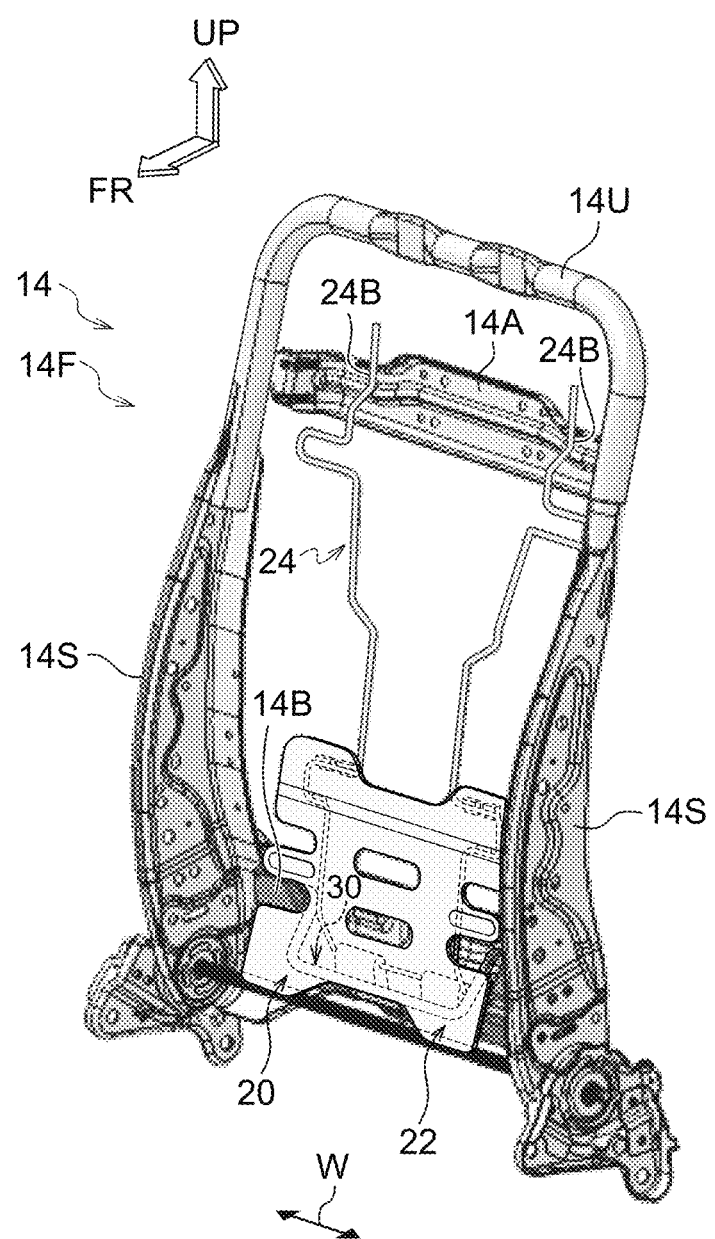
FIG. 2 is a perspective view illustrating a framework structure of a seatback of the vehicle seat in FIG. 1.

FIG. 2 is a perspective view illustrating a framework structure of the seatback 14. As illustrated in FIG. 2, the seatback frame 14F includes a pair of left and right side frames 14S extending in a seatback up-down direction at both sides of the seatback frame 14F, and an upper frame 14U configured in an upside-down U-shape in front view of the seatback so as to link together upper end portions of the left and right side frames 14S. The seatback frame 14F further includes a seatback upper panel 14A linking together a pair of left and right up-down-extending portions of the upper frame 14U in the seat width direction, and a seatback lower panel 14B (see FIG. 5) linking together lower portions of the left and right side frames 14S in the seat width direction.

Figure 3:
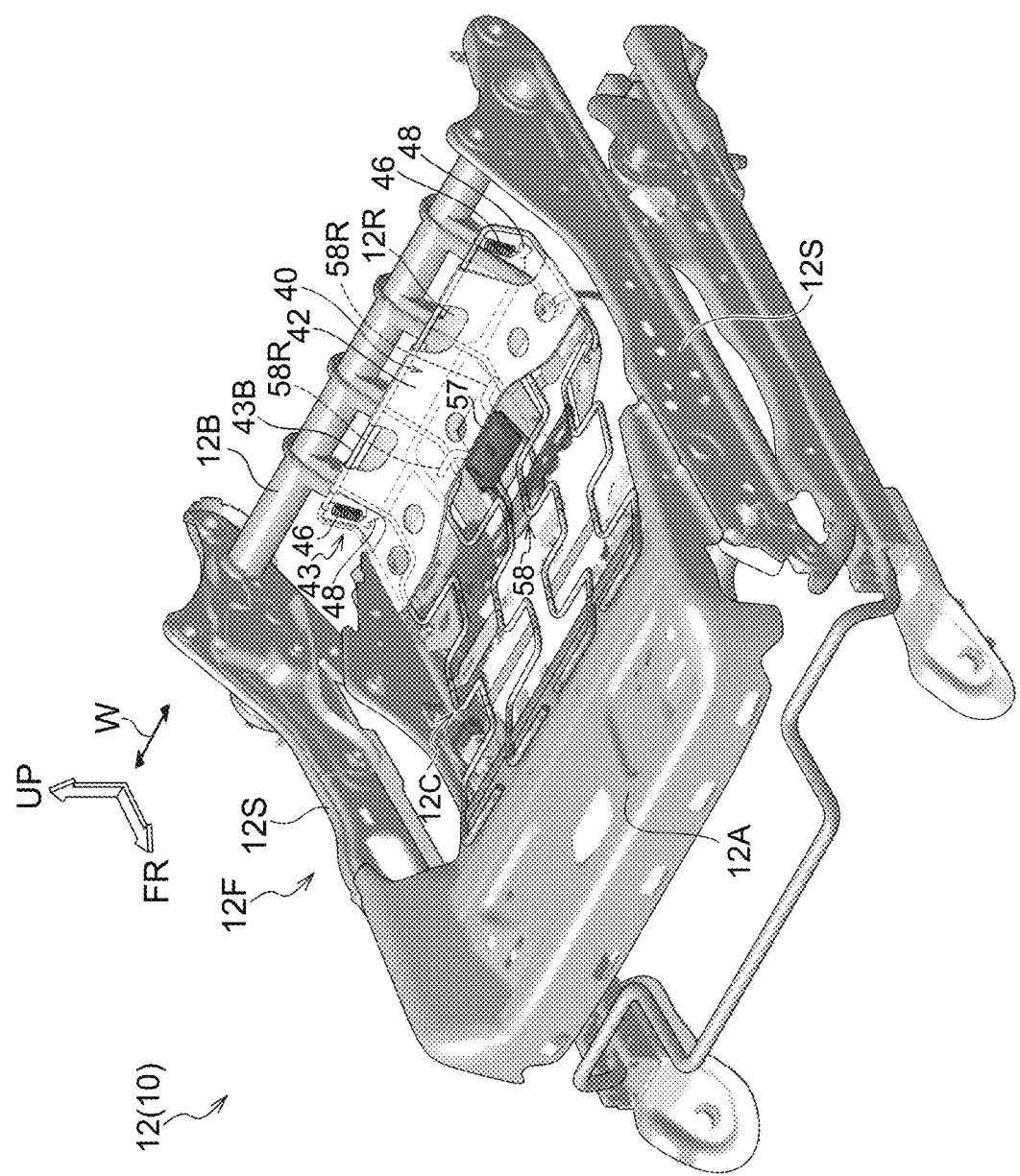
FIG. 3 is a perspective view illustrating a framework structure of a seat cushion of the vehicle seat in FIG. 1.

FIG. 3 is a perspective view illustrating a framework structure of the seat cushion 12. As illustrated in FIG. 3, the seat cushion frame 12F includes a pair of left and right side frame sections 12S extending in the seat front-rear direction at both sides of the seat cushion frame 12F, a seat pan section 12A spanning between front end portions of the pair of left and right side frame sections 12S, and a rod 12B coupling together rear end portions of the pair of left and right side frame sections 12S. A seat cushion spring 12C spans between the seat pan section 12A and the rod 12B. The seat cushion spring 12C is configured by plural S-shaped springs (four in this example) arranged along the seat width direction. In side view, a rear section of the seat cushion spring 12C is inclined toward the seat upper side on progression the seat rear side at a location further toward the front side than the rod 12B. A rear panel 12R extending in the seat width direction is attached to the rear section of the seat cushion spring 12C.

Figure 4A:
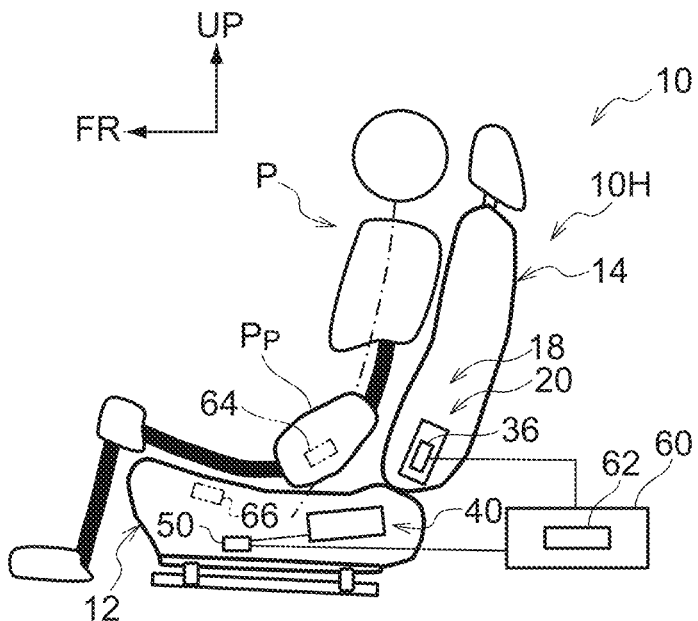
FIG. 4A is a schematic side view illustrating a pelvis support of the vehicle seat in FIG. 1 when in a non-pressing state.
Figure 4B:
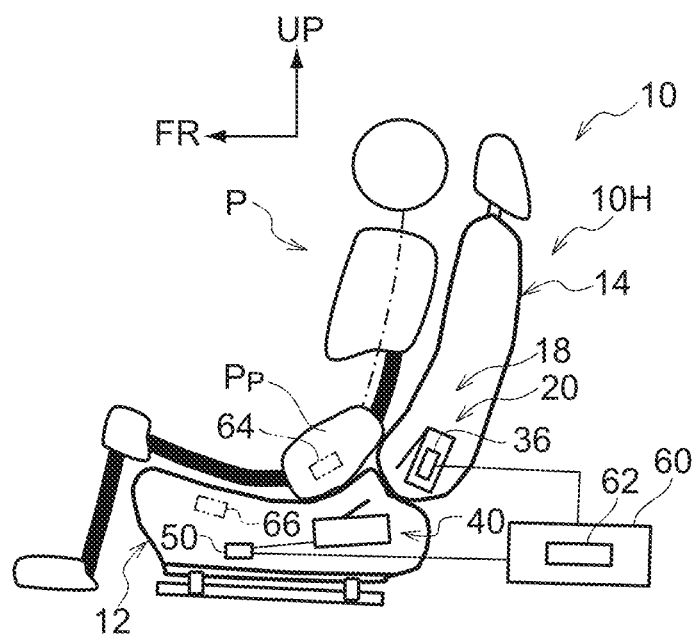
FIG. 4B is a schematic side view illustrating the pelvis support of the vehicle seat in FIG. 1 when in a pressing state.

As illustrated in FIG. 4A, the seat body 10H is provided with a pelvis support 18 (illustrated schematically in FIG. 4 for simplicity), serving as a pressing mechanism. The pelvis support 18 is capable of switching between a pressing state in which the pelvis support 18 presses against the pelvis Pp of the seated occupant P as illustrated in FIG. 4B, and a non-pressing state in which the pelvis support 18 does not press against the pelvis Pp of the seated occupant P as illustrated in FIG. 4A. In the present exemplary embodiment, the pelvis support 18 adopts the pressing state when switched ON, and the pelvis support 18 adopts the non-pressing state when switched OFF. Explanation follows regarding an example of configuration of the pelvis support 18.

The pelvis support 18 includes a lower back support 20 provided to the seatback frame 14F illustrated in FIG. 2, and a cushion support 40 provided to the seat cushion frame 12F illustrated in FIG. 3.

Figure 5:
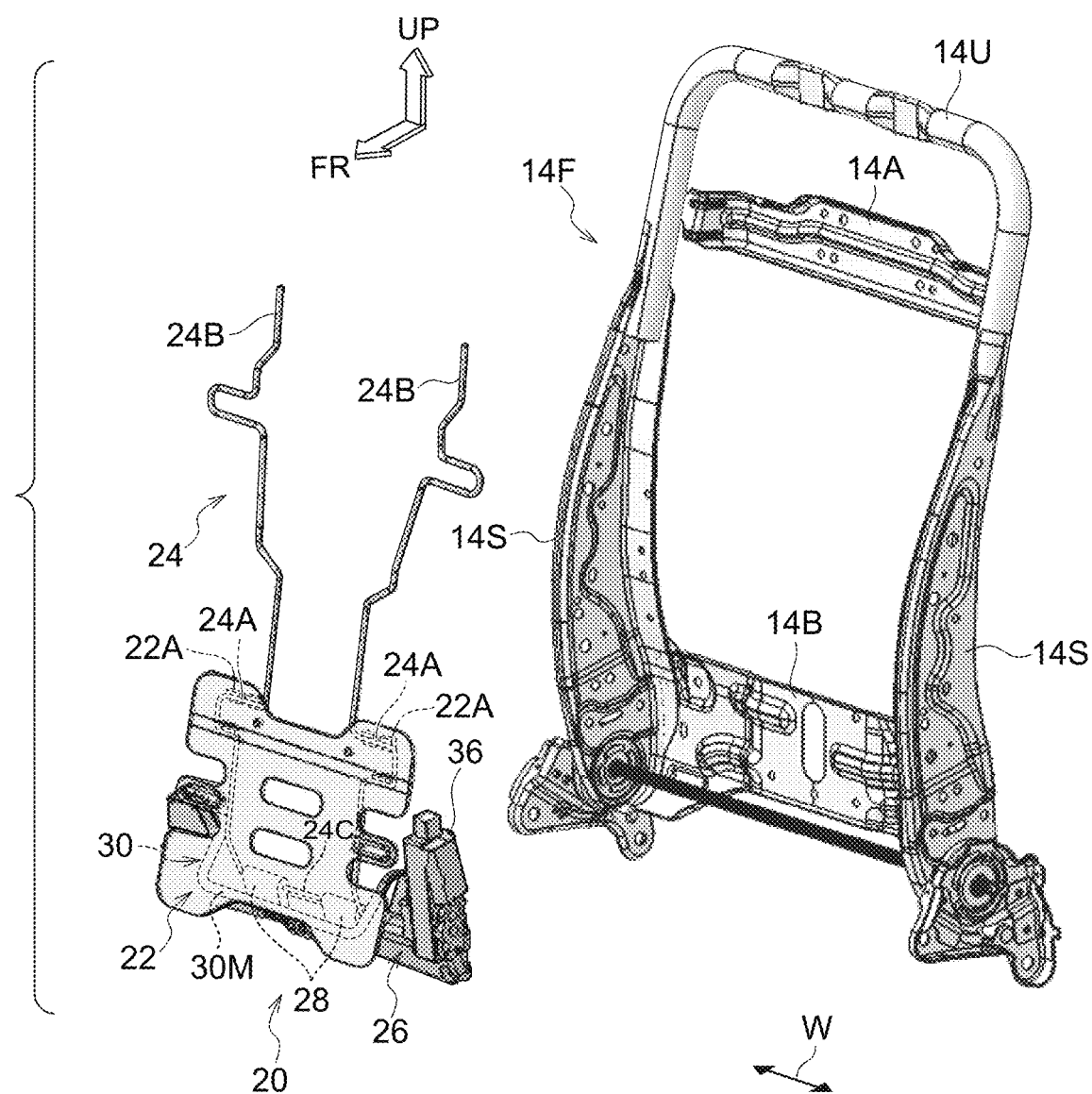
FIG. 5 is an exploded perspective view illustrating a framework structure of the seatback in FIG. 2 when divided into a seatback frame and a lower back support.
Figure 6:
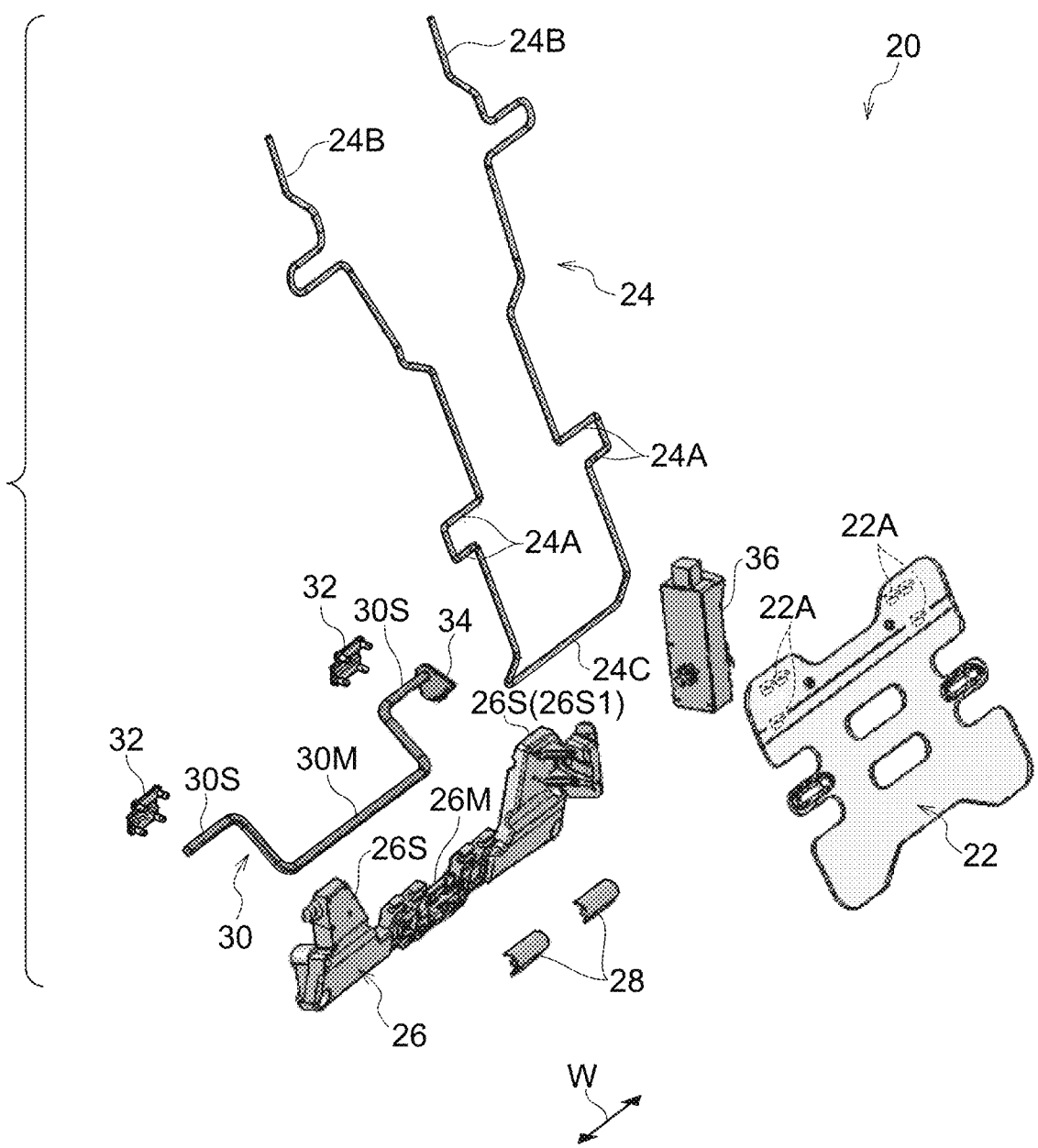
FIG. 6 is an exploded perspective view illustrating the lower back support in FIG. 5.

FIG. 5 is an exploded perspective view in which the framework structure of the seatback 14 (see FIG. 1) is split into that of the seatback frame 14F and that of the lower back support 20. FIG. 6 is an exploded perspective view of the lower back support 20.

As illustrated in FIG. 5 and FIG. 6, the lower back support 20 includes a resin plate 22 used to press a lower portion of the seatback pad 14P (see FIG. 1) toward the seat front side. An upper portion of a back face of the plate 22 is formed with a pair of left and right anchor portions 22A. The anchor portions 22A are anchored to anchoring portions 24A of a seat attachment wire 24. The wire 24 has a substantially U-shape in front view, and the anchoring portions 24A are formed at the lower sides of up-down direction intermediate portions of the wire 24. The anchoring portions 24A are formed at locations where the wire 24 is bent so as to jut out in substantially U-shapes toward the seat width direction outsides. Upper portions 24B of the wire 24 are anchored to the seatback upper panel 14A of the seatback frame 14F (see FIG. 2).

A lower portion of the wire 24 is inclined toward a seat back face side on progression the seat lower side. A lower edge 24C configuring a lower end portion of the wire 24 is clamped in the seat front-rear direction between a left-right direction intermediate portion 26M of a resin fixing member 26, and a pair of left and right bushes 28. In this state, the bushes 28 are screwed onto the fixing member 26. The fixing member 26 is formed in a laterally-extending substantially U-shape in front view, and in a completed state of the vehicle seat 10, the fixing member 26 is screwed onto the seatback lower panel 14B of the seatback frame 14F at the top and bottom on both the left and right.

An axial direction intermediate portion 30M of a drive wire 30 is provided between left and right side portions 26S of the fixing member 26. Axial direction end portions 30S of the drive wire 30 are disposed with their axial directions running in the seat width direction, and are each clamped between the corresponding left or right side portion 26S of the fixing member 26 and a fixing component 32 (see FIG. 6). In this state, the fixing components 32 are screwed onto the fixing member 26. The axial direction intermediate portion 30M of the drive wire 30 is bent toward the lower side in a U-shape, and is disposed at the seat front side of the left-right direction intermediate portion 26M of the fixing member 26 (see FIG. 6). A gear 34 (see FIG. 6) with its axial direction in the seat width direction is integrated to one axial direction end side of the drive wire 30.

A motor 36 is disposed adjacent to the gear 34. The motor 36 is screwed onto one of the side portions 26S (26S1) of the fixing member 26. An output side of the motor 36 is connected to the gear 34. The motor 36 is capable of being driven both forward and in reverse, and is disposed such that rotating the gear 34 causes the drive wire 30 to rotate about its axial direction running in the seat width direction.

Figure 7A:
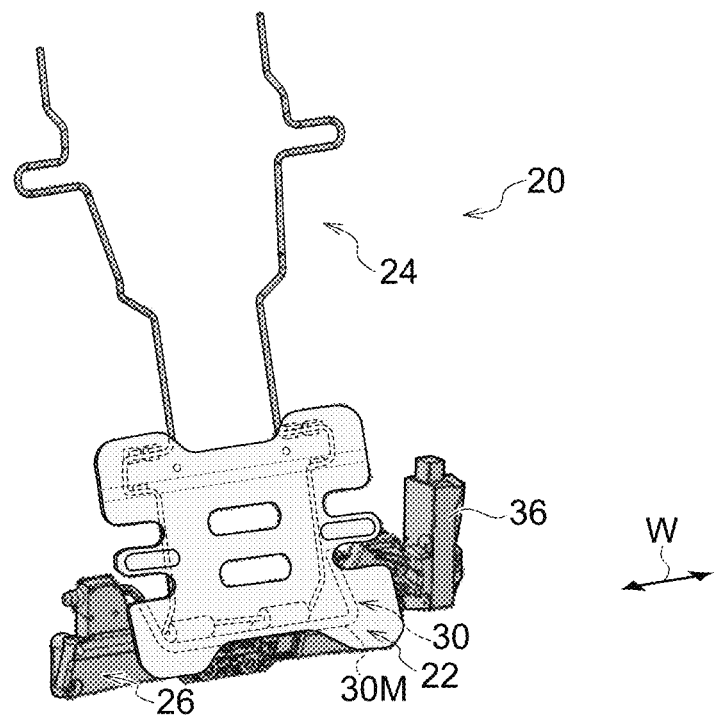
FIG. 7A is a perspective view illustrating the lower back support in FIG. 5 in a state prior to actuation.
Figure 7B:
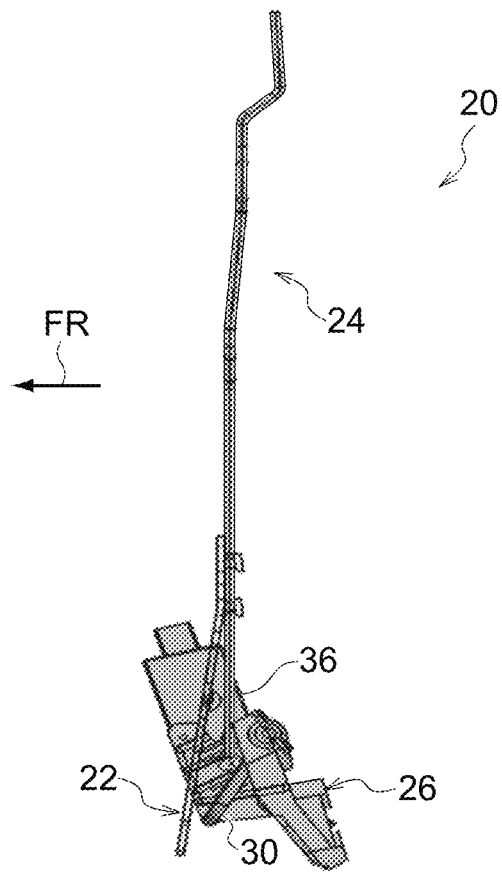
FIG. 7B is a side view illustrating the lower back support in FIG. 5 in a state prior to actuation.
Figure 8A:
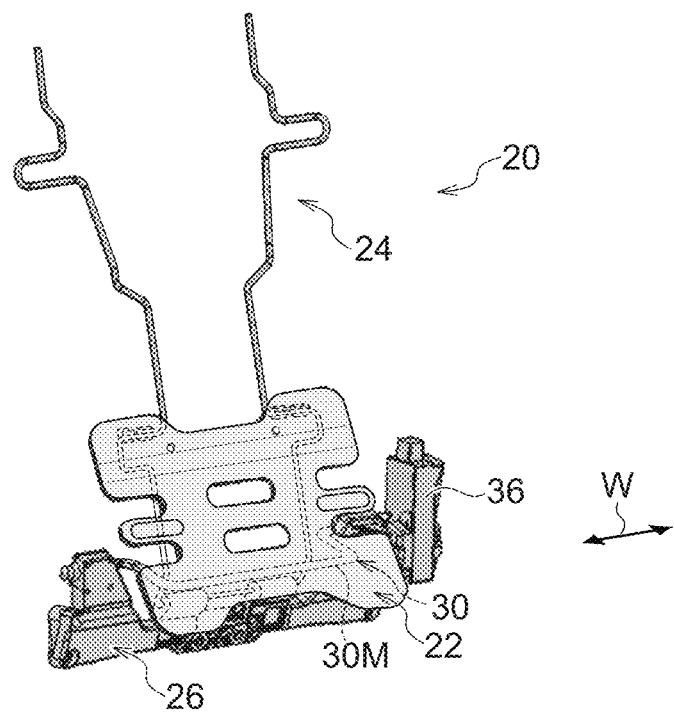
FIG. 8A is a perspective view illustrating the lower back support in FIG. 5 in a state after actuation.
Figure 8B:
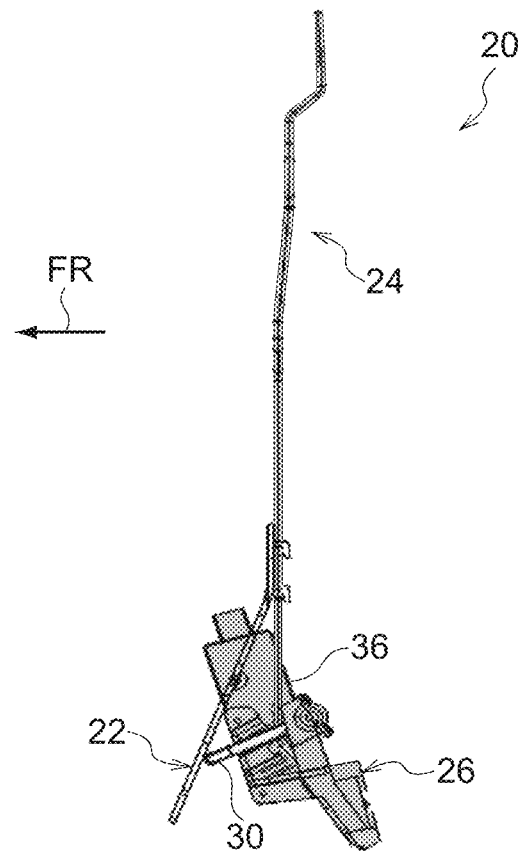
FIG. 8B is a side view illustrating the lower back support in FIG. 5 in a state after actuation.

FIG. 7A is a perspective view illustrating the lower back support 20 in a state prior to actuation. FIG. 7B is a side view illustrating the lower back support 20 in the state prior to actuation. FIG. 8A is a perspective view illustrating the lower back support 20 in a state after actuation. FIG. 8B is a side view illustrating the lower back support 20 in the state after actuation. As illustrated in FIG. 7A to FIG. 8B, when the drive wire 30 rotates about its axis along the seat width direction, a major portion (a portion excluding an upper end portion) of the plate 22 swings between a non-pressing position illustrated in FIG. 7A and FIG. 7B and a pressing position illustrated in FIG. 8A and FIG. 8B. Note that the non-pressing position illustrated in FIG. 7A and FIG. 7B is a position where the plate 22 does not press a lower portion of the seatback pad 14P (see FIG. 1) toward the seat front side, whereas the pressing position illustrated in FIG. 8A and FIG. 8B is a position where the plate 22 presses the lower portion of the seatback pad 14P (see FIG. 1) toward the seat front side.

Figure 10:
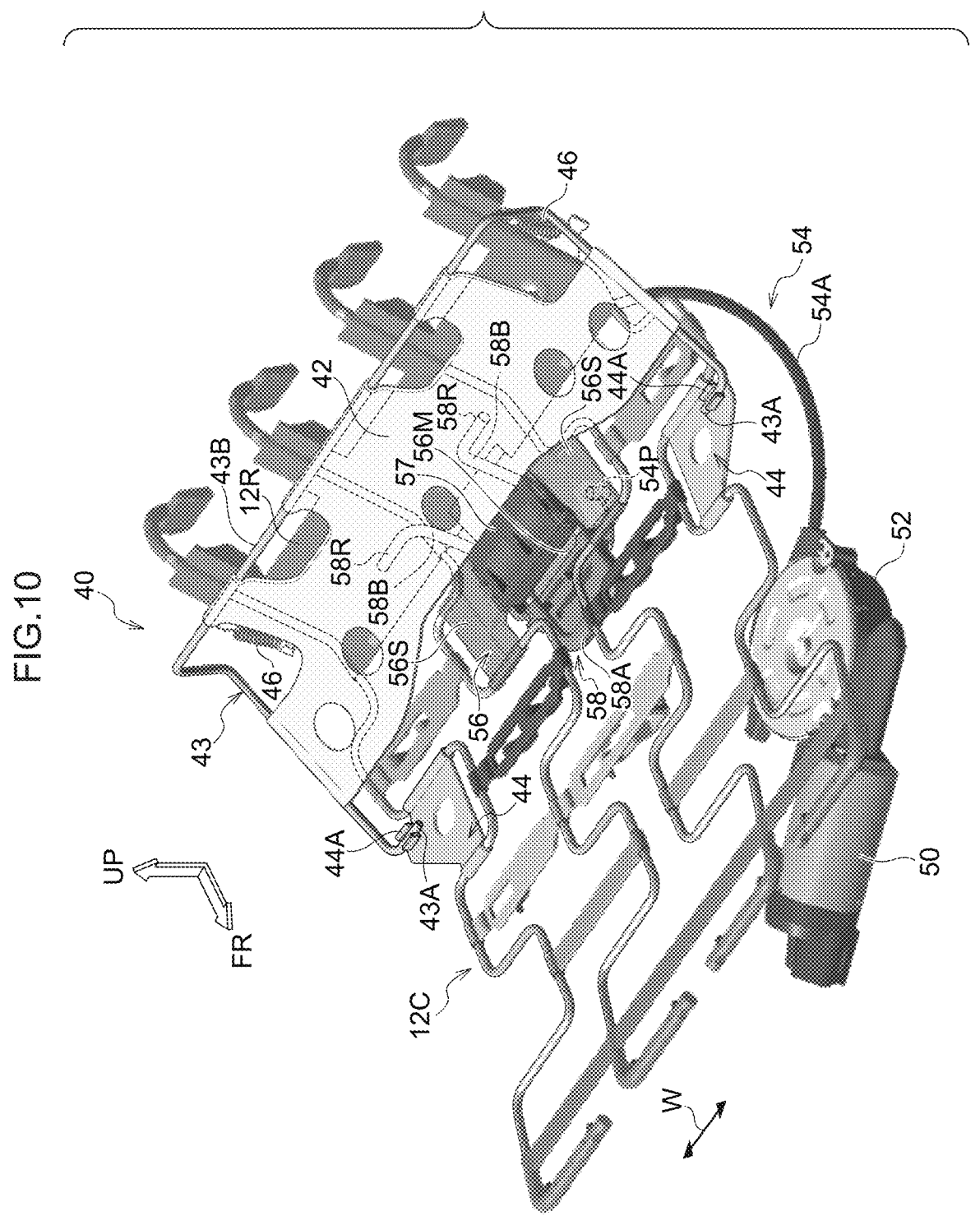

FIG. 9 is an exploded perspective view illustrating part of the framework structure of the seat cushion 12 (see FIG. 1). FIG. 10 is a perspective view illustrating the cushion support 40 in a state after actuation as viewed from an oblique upper side. As illustrated in FIG. 9 and FIG. 10, the cushion support 40 includes a cushion pan 42 at the upper side of a rear portion of the seat cushion spring 12C and the rear panel 12R. The cushion pan 42 is a panel shaped member for pressing a rear portion of the seatback pad 14P (see FIG. 1) toward the seat upper side.

A single wire 43 that is bent so as to pass through a rear end portion and side end portions of the cushion pan 42 is attached to the cushion pan 42. The wire 43 is formed in a substantially U-shape opening toward the seat front side in plan view, and is formed in a substantially L-shape rising at a rear end portion in side view. A front end portion of the wire 43 is formed with a pair of short attachment shafts 43A extending toward each other in plan view. The pair of attachment shafts 43A are supported by shaft support portions 44A of respective support tabs 44 fixed to both sides of a seat front-rear direction intermediate portion of the seat cushion spring 12C, such that the attachment shafts 43A are capable of rotating about an axis running in the seat width direction. The cushion pan 42 is thus capable of swinging about its axis running in the seat width direction between a non-pressing position illustrated in FIG. 3 and a pressing position illustrated in FIG. 10. Note that the non-pressing position illustrated in FIG. 3 is a position where the cushion pan 42 does not press the rear portion of the seatback pad 14P (see FIG. 1) toward the seat upper side, and the pressing position illustrated in FIG. 10 is a position where the cushion pan 42 presses the rear portion of the seatback pad 14P (see FIG. 1) toward the seat upper side.

One end side of a tension spring 46 is anchored to a rear end portion 43B of the wire 43 illustrated in FIG. 3 and FIG. 9 at locations on both sides of the wire rear end portion 43B. The tension springs 46 are configured by tension coil springs disposed along the seat up-down direction in the present exemplary embodiment. The other end sides of the tension springs 46 are anchored to respective anchoring members 48 provided on both sides of the rear panel 12R. The anchoring members 48 are fixed by being screwed to the rear panel 12R, and jut out toward the seat width direction outsides with respect to the rear panel 12R. Accordingly, the tension springs 46 bias the cushion pan 42 toward the non-pressing position as illustrated in FIG. 3.

As illustrated in FIG. 9, a support panel 56 is attached to a seat width direction intermediate portion of the seat cushion spring 12C at a seat front-rear direction position further toward the seat front side than the rear panel 12R and further toward the seat rear side than the support tabs 44. Two side portions 56S of the support panel 56 are attached to the seat cushion spring 12C. A depression 56M recessed in a downward step with respect to the two side portions 56S of the support panel 56 is formed at a seat width direction intermediate portion of the support panel 56. A bottom face of the depression 56M is inclined toward the seat upper side on progression the seat rear side while gently curving such that a seat oblique lower rear side forms a radial direction outside.

As illustrated in FIG. 10, an attachment member 57 is disposed at an upper side of the depression 56M in the support panel 56. Two side portions of the attachment member 57 are attached to the two sides of the depression 56M in the support panel 56. Part of a movable member 58 is disposed between the depression 56M in the support panel 56 and the attachment member 57.

As illustrated in FIG. 9, the movable member 58 includes a load bearing portion 58A configuring a front end portion of the movable member 58, and a pair of left and right arms 58B extending from the load bearing portion 58A toward the seat upper-rear side. Rear end portions 58R of the pair of left and right arms 58B extend in directions away from each other. As illustrated in FIG. 10, parts of the pair of left and right arms 58B are disposed between the depression 56M in the support panel 56 and the attachment member 57.

Figure 11A:
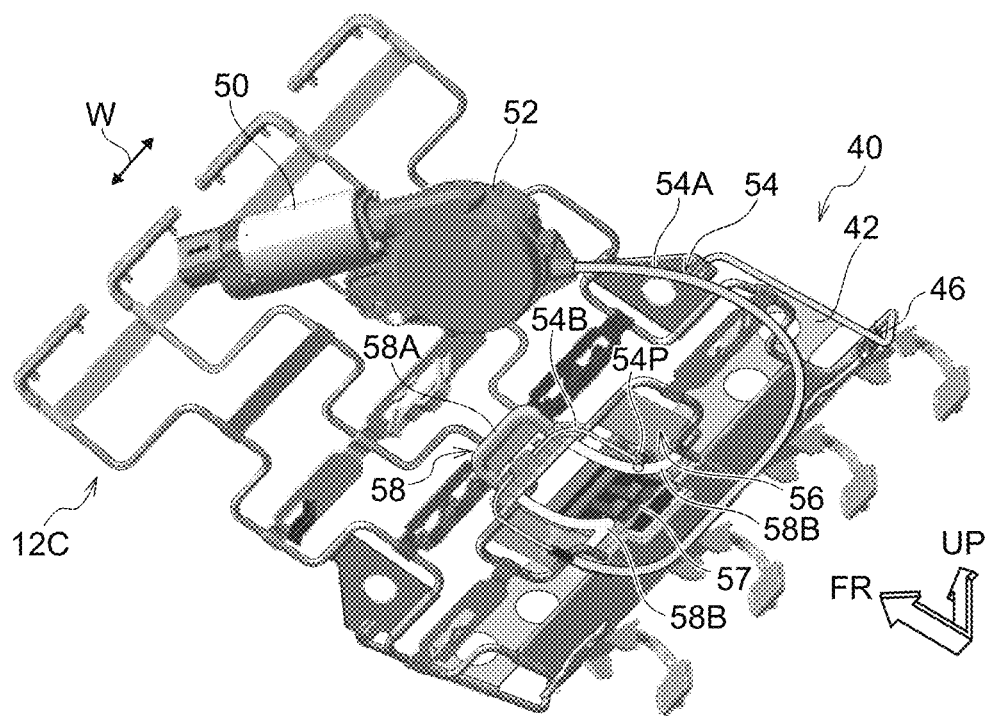
FIG. 11A is a perspective view illustrating the cushion support in FIG. 3 in a state prior to actuation as viewed from an oblique lower side.
Figure 11B:
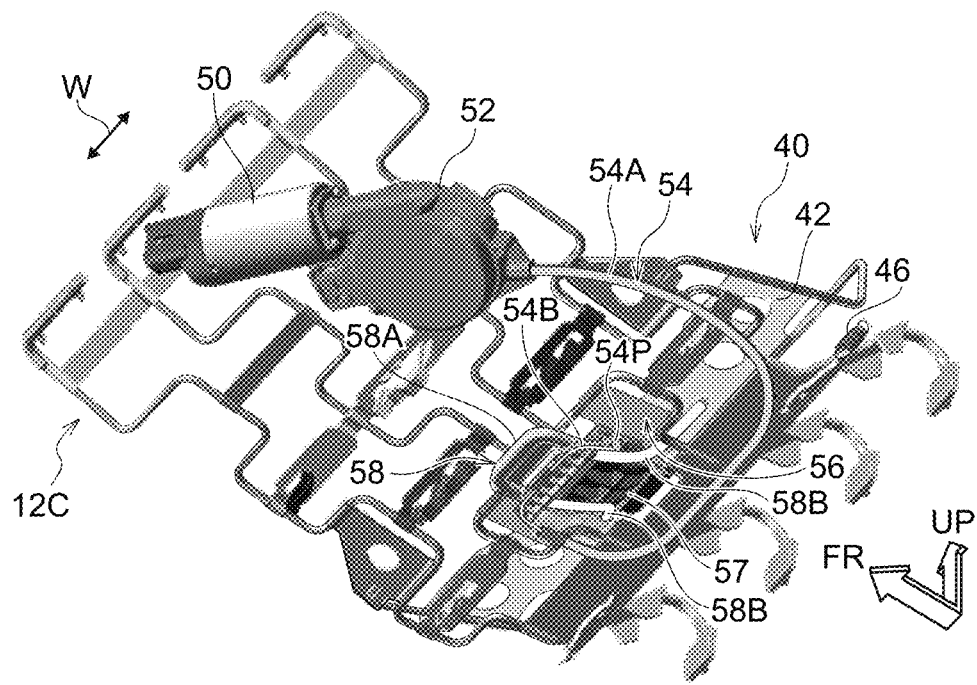
FIG. 11B is a perspective view illustrating the cushion support in FIG. 3 in a state after actuation as viewed from an oblique lower side.

FIG. 11A is a perspective view illustrating the cushion support 40 in a state prior to actuation, as viewed from an oblique lower side. FIG. 11B is a perspective view illustrating the cushion support 40 in a state after actuation as viewed from an oblique lower side. Note that FIG. 11A and FIG. 11B, locations including the depression 56M in the support panel 56 (see FIG. 9) are cut away to show the position of the arms 58B of the movable member 58. The movable member 58 is capable of moving between the position illustrated in FIG. 3 and FIG. 11A (a position not pressing the cushion pan 42), and the position illustrated in FIG. 10 and FIG. 11B (a position pressing the cushion pan 42).

As illustrated in FIG. 11A and FIG. 11B, a portion of an inner cable 54B extending in the seat width direction is anchored to the load bearing portion 58A of the movable member 58. An attachment pin 54P attached to a leading end portion of the inner cable 54B is attached to the support panel 56 (see FIG. 10), and another end portion of the inner cable 54B is fixed to a take-up section of a take-up device 52. The inner cable 54B is inserted through an outer cable 54A so as to be capable of moving inside the outer cable 54A, and a leading end portion side location of the inner cable 54B is exposed from the outer cable 54A. Together, the outer cable 54A and the inner cable 54B configure a cable 54.

A base end side of the outer cable 54A is attached to the take-up device 52. The take-up device 52 is provided with a motor 50. Actuating the motor 50 causes the take-up section of the take-up device 52 to rotate.

Thus, actuating the motor 50 rotates the take-up section of the take-up device 52 so as to take up the inner cable 54B, such that the inner cable 54B displaces the load bearing portion 58A from the state illustrated in FIG. 11A toward the seat upper-rear side as illustrated in FIG. 11B. Namely, configuration is made such that actuating the motor 50 displaces the movable member 58 toward the seat upper-rear side and moves the cushion pan 42 from the non-pressing position to the pressing position. When the motor 50 is stopped, the cushion pan 42 moves from the pressing position to the non-pressing position under the biasing force of the tension springs 46 (see FIG. 3).

As is schematically illustrated in FIG. 4A, the motor 36 and the motor 50 are electrically connected to an ECU 60 (illustrated in block form in FIG. 4A). The ECU 60 includes a CPU, ROM, RAM, storage, and a communication interface, and these configuration sections are connected together so as to be capable of communicating with each other through a bus. Functional configuration of the ECU 60 includes a control section 62. Functional configuration of the control section 62 is implemented by the CPU reading and executing a program stored in the ROM or the storage.

As an example, a buckle switch 64 (illustrated in block form by a double-dotted dashed line in FIG. 4A) is electrically connected to the ECU 60 (this connected state is not illustrated in the drawings). The buckle switch 64 outputs a signal to the ECU 60 indicating whether or not a tongue plate of a non-illustrated seatbelt device has been fitted to a buckle. Moreover, as an example, a seat sensor 66 (illustrated in block form by a double-dotted dashed line in FIG. 4A) is also electrically connected to the ECU 60 (this connected state is not illustrated in the drawings). The seat sensor 66 is provided in the seat cushion 12, and outputs a signal to the ECU 60 indicating whether or not an occupant is sitting on the seat body 10H.

In a state in which an occupant is sitting on the seat body 10H, the control section 62 of the ECU 60 controls the pelvis support 18 so as to alternate repeatedly between the pressing state illustrated in FIG. 4B and the non-pressing state illustrated in FIG. 4A. As an example, the control section 62 determines whether or not an occupant is sitting on the seat body 10H based on the signal to the ECU 60 from the seat sensor 66. Note that as an example, the control section 62 controls the pelvis support 18 so as to adopt the pressing state illustrated in FIG. 4B starting when a signal indicating that the tongue plate of the non-illustrated seatbelt device has been fitted to the buckle has been input to the ECU 60 from the buckle switch 64. Moreover, as an example, the control section 62 ends control of the pelvis support 18 when a signal indicating that the tongue plate has been removed from the buckle has been input to the ECU 60 from the buckle switch 64. As a modified example, the control section 62 may start and end control of the pelvis support 18 based on ON/OFF signals of an operation switch (not illustrated in the drawings) capable of being operated by a seated occupant instead of based on signals from the buckle switch 64.

Figure 13:
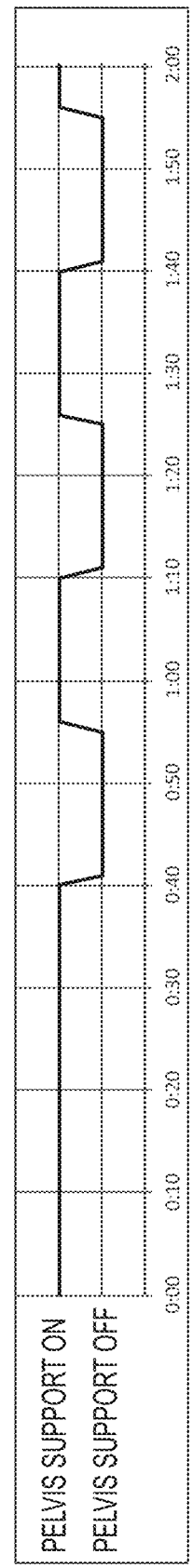
FIG. 13 illustrates an actuation timing cycle of the pelvis support of the vehicle seat in FIG. 1.

The control section 62 preferably also controls the pelvis support 18 such that a continuation duration of the pressing state initially after the occupant sits down is around 35 minutes to 45 minutes, and is a longer duration than a continuation duration of the pressing state from the second time onward after the occupant has sat down. FIG. 13 illustrates an actuation timing cycle of the pelvis support 18. As illustrated in FIG. 13, as an example in the present exemplary embodiment, the control section 62 (see FIG. 4B) controls the pelvis support 18 such that the continuation duration of the pressing state initially after the occupant sits down is 40 minutes, and that the continuation duration of the pressing state from the second time onward after the occupant has sat down is 15 minutes. Also as an example, the control section 62 (see FIG. 4B) controls the pelvis support 18 such that the continuation duration of the non-pressing state after the occupant has sat down is 15 minutes.

Figure 14:
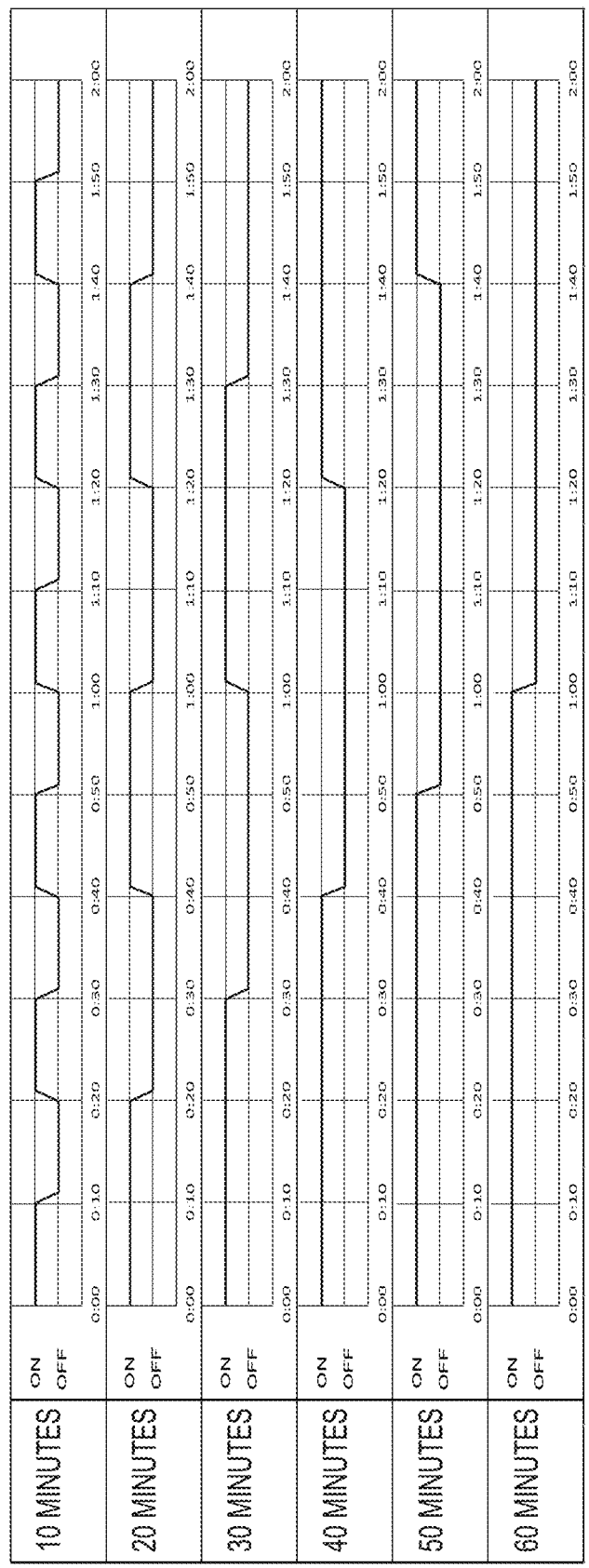
FIG. 14 illustrates timing cycles employed during testing to determine a continuation duration of an initial pressing state.
Figure 15:
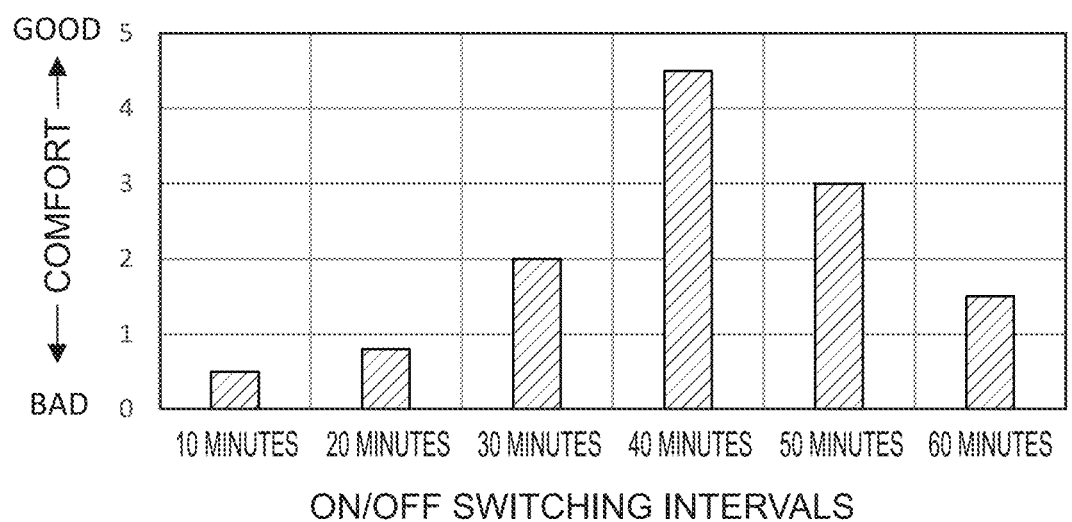
FIG. 15 is a histogram illustrating comfort evaluation results of an evaluation performed one hour after starting operation for each of the timing cycles illustrated in FIG. 14.

Explanation follows regarding the reasoning behind setting the continuation duration of the pressing state initially after the occupant sits down to 40 minutes in the present exemplary embodiment. FIG. 14 illustrates timing cycles trialed during testing to determine a continuation duration of the initial pressing state. Note that in FIG. 14, ON indicates the pelvis support 18 being in an ON state, and OFF indicates the pelvis support 18 being in an OFF state. FIG. 15 is a histogram illustrating comfort evaluation results of an evaluation performed one hour after starting operation for each of the timing cycles illustrated in FIG. 14. Note that the vertical axis in FIG. 15 represents sensory evaluation levels for overall comfort, with higher values corresponding to greater comfort. Level 5 corresponds to a state in which the occupant is comfortable, level 4 corresponds to a state in which the occupant experiences some mild discomfort, level 3 corresponds to a state in which the occupant experiences discomfort but within tolerable limits, level 2 corresponds to a state in which the occupant wishes to adjust their posture, and level 1 corresponds to state in which the occupant wishes to leave the seat.

As illustrated in FIG. 14, testing was performed for six different patterns, in which switching between the pressing state (ON state) and the non-pressing state (OFF state) was performed at 10 minute intervals, 20 minute intervals, 30 minute intervals, 40 minute intervals, 50 minute intervals, and 60 minute intervals respectively. Note that each pattern started in the pressing state (ON state).

As illustrated in FIG. 15, this testing demonstrated that the 40 minute pattern was the most comfortable out of the six patterns. Accordingly, the continuation duration of the pressing state initially after the occupant sits down is set to 40 minutes in the present exemplary embodiment. Note that it may be surmised from the histogram in FIG. 15 that a continuation duration of the pressing state initially after the occupant sits down of between 35 minutes and 45 minutes would be capable of securing a certain degree of comfort.

Figure 16:
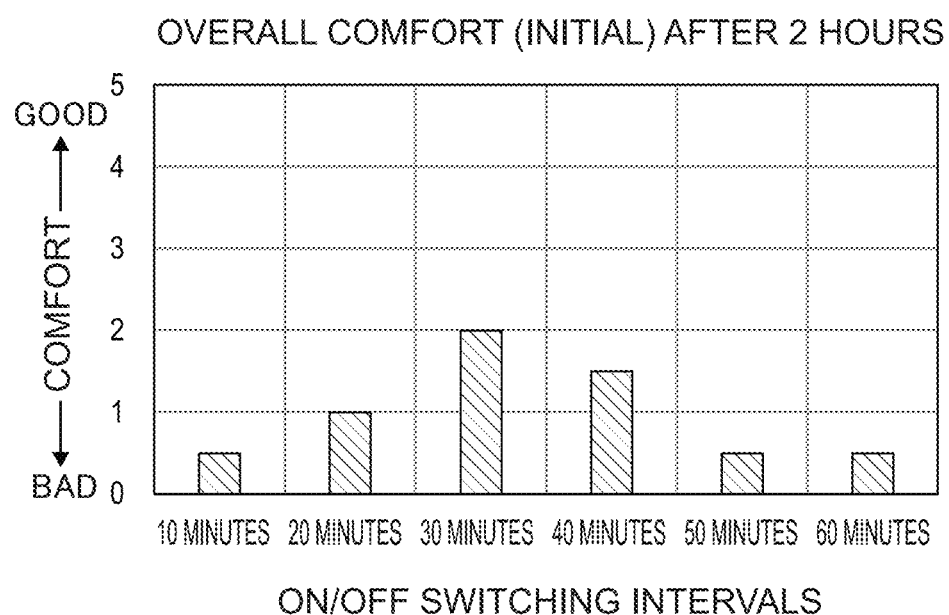
FIG. 16 is a histogram illustrating comfort evaluation results of an evaluation performed two hours after starting operation for each of the timing cycles illustrated in FIG. 14.

FIG. 16 is a histogram illustrating comfort evaluation results of an evaluation performed two hours after starting operation for each of the timing cycles illustrated in FIG. 14. The levels of the vertical axis of FIG. 16 are the same as the levels of the vertical axis of FIG. 15. As illustrated in FIG. 16, the pattern where switching was performed at 40 minute intervals was demonstrated not to be the best pattern when evaluation was performed two hours after starting operation.

Figure 17:
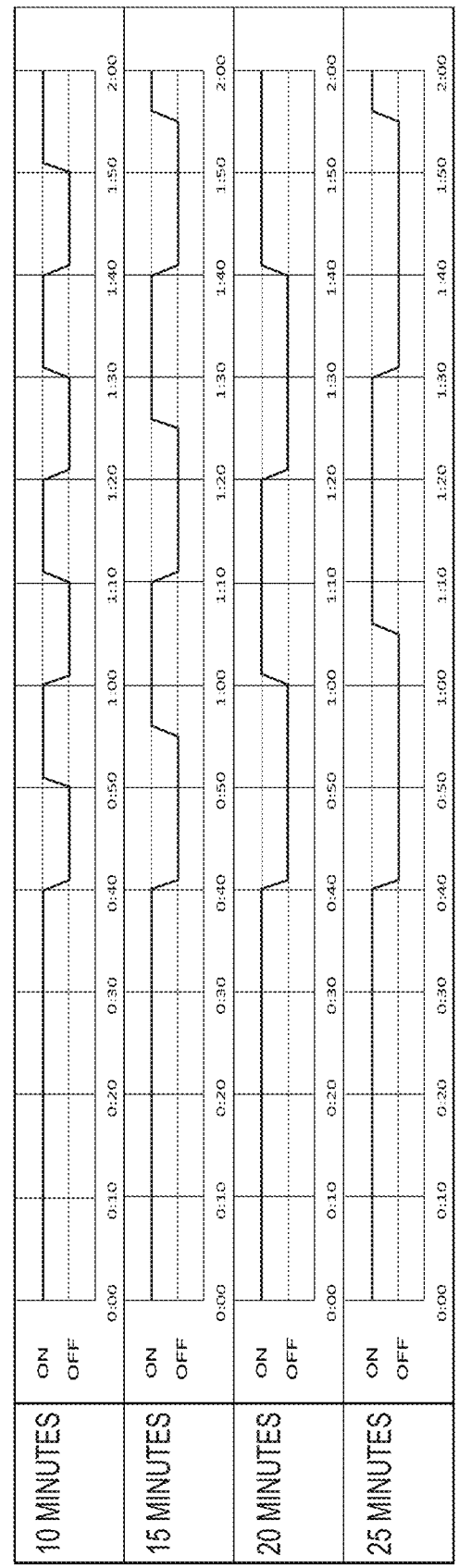
FIG. 17 illustrates timing cycles employed during testing to determine a continuation duration of a pressing state from a second time onward.
Figure 18:
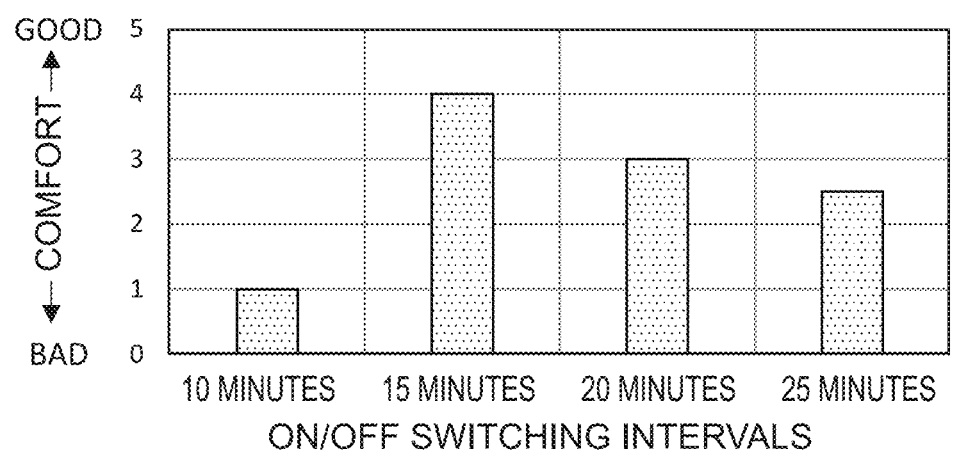
FIG. 18 is a histogram illustrating comfort evaluation results of an evaluation performed two hours after starting operation for each of the timing cycles illustrated in FIG. 17.

Explanation follows regarding the reasoning behind setting the continuation duration of the pressing state from the second time onward after the occupant has sat down to 15 minutes in the present exemplary embodiment. FIG. 17 illustrates timing cycles employed during testing to determine the continuation duration of the pressing state from the second time onward. Note that in FIG. 17, ON indicates the pelvis support 18 being in an ON state, and OFF indicates the pelvis support 18 being in an OFF state. FIG. 18 is a histogram illustrating comfort evaluation results of an evaluation performed two hours after starting operation for each of the timing cycles illustrated in FIG. 17. Note that levels of the vertical axis of FIG. 18 are the same as the levels of the vertical axis of FIG. 15.

As illustrated in FIG. 17, testing was performed for four different patterns, in which the continuation duration of the pressing state (ON state) initially after the occupant sits down was set to 40 minutes, and subsequent switching between the pressing state (ON state) and the non-pressing state (OFF state) was performed at 10 minute intervals, 15 minute intervals, 20 minute intervals, and 25 minute intervals respectively.

As illustrated in FIG. 18, this testing demonstrated that the 15 minute pattern was the most comfortable out of the four patterns. Accordingly, the continuation duration of the pressing state from the second time onward after the occupant has sat down is set to 15 minutes in the present exemplary embodiment. Note that it may be surmised from the histogram in FIG. 18 that a continuation duration of the pressing state from the second time onward after the occupant has sat down of between 14 minutes and 18 minutes would be capable of securing a certain degree of comfort.

Operation and Advantageous Effects

Explanation follows regarding operation and advantageous effects of the present exemplary embodiment.

In the present exemplary embodiment, the pelvis support 18 illustrated in FIG. 4A, etc. is capable of switching between the pressing state illustrated in FIG. 4B, in which the pelvis support 18 presses against the pelvis Pp of the seated occupant P, and the non-pressing state illustrated in FIG. 4A, in which the pelvis support 18 does not press against the pelvis Pp of the seated occupant P. In a state in which an occupant is sitting on the seat body 10H, the control section 62 illustrated in FIG. 4A controls the pelvis support 18 so as to alternate repeatedly between the pressing state illustrated in FIG. 4B and the non-pressing state illustrated in FIG. 4A.

Figure 12A:
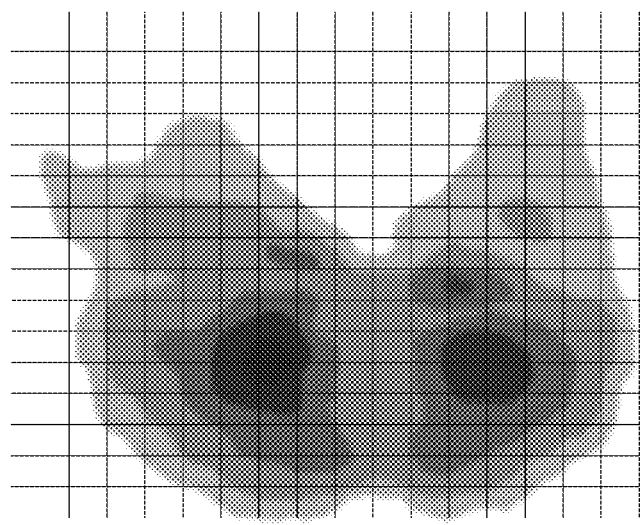
FIG. 12A illustrates a body pressure distribution of a seated occupant on a seat cushion when in a state corresponding to that illustrated in FIG. 4A.
Figure 12B:
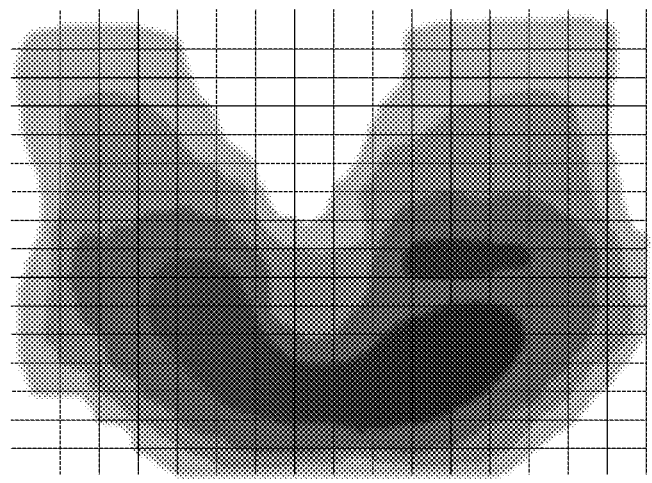
FIG. 12B illustrates a body pressure distribution of a seated occupant on a seat cushion when in a state corresponding to that illustrated in FIG. 4B.

FIG. 12A illustrates a body pressure distribution of the seated occupant P on the seat cushion 12 when in a state corresponding to that illustrated in FIG. 4A, and FIG. 12B illustrates a body pressure distribution of the seated occupant P on the seat cushion 12 when in a state corresponding to that illustrated in FIG. 4B. In FIG. 12A and FIG. 12B, the vertical axis direction corresponds to the seat front-rear direction, and the horizontal axis direction corresponds to the seat width direction. Dark colored portions in FIG. 12A and FIG. 12B represent higher pressure.

As illustrated in FIG. 12A and FIG. 12B, the body pressure distribution in the vicinity of the pelvis Pp of the seated occupant P differs between the pressing state of the pelvis support 18 and the non-pressing state of the pelvis support 18. More specifically, in the pressing state of the pelvis support 18, the pelvis Pp of the seated occupant P is stably supported such that the body pressure of the seated occupant P is dispersed (see FIG. 12B). On the other hand, in the non-pressing state of the pelvis support 18, the stable support of the pelvis Pp of the seated occupant P is withdrawn, such that the body pressure of the seated occupant P is concentrated at specific left and right locations (see FIG. 12A).

Switching the pelvis support 18 between the pressing state illustrated in FIG. 4A and the non-pressing state illustrated in FIG. 4B therefore changes the body pressure distribution in the vicinity of the pelvis Pp of the seated occupant P (see FIG. 12A and FIG. 12B). This suppresses a reduction in the fatigue alleviation effect, even if the seated occupant P remains seated for a long time.

Moreover, in the present exemplary embodiment, the control section 62 also controls the pelvis support 18 such that the continuation duration of the pressing state initially after the occupant sits down is 40 minutes, and is a longer duration than the continuation duration of the pressing state from the second time onward after the occupant has sat down. From the testing results described above, it has been established that it is more comfortable to stabilize the pelvis Pp of the seated occupant P for longer during a stage initially after the occupant sits down than during subsequent stages, and that a high comfort level is achieved by setting the continuation duration of the pressing state initially after the occupant sits down to 40 minutes. Accordingly, the configuration of the present exemplary embodiment is capable of alleviating fatigue initially after the occupant sits down, and also of switching the pelvis support 18 from the pressing state illustrated in FIG. 4B to the non-pressing state illustrated in FIG. 4A at a timing shortly before the seated occupant P would want the pressing against their pelvis Pp to be relieved, thus suppressing a reduction in the fatigue alleviation effect.

As described above, the vehicle seat 10 of the present exemplary embodiment is capable of suppressing a reduction in the fatigue alleviation effect, even when remaining seated for a long time.

Second Exemplary Embodiment

Figure 19:
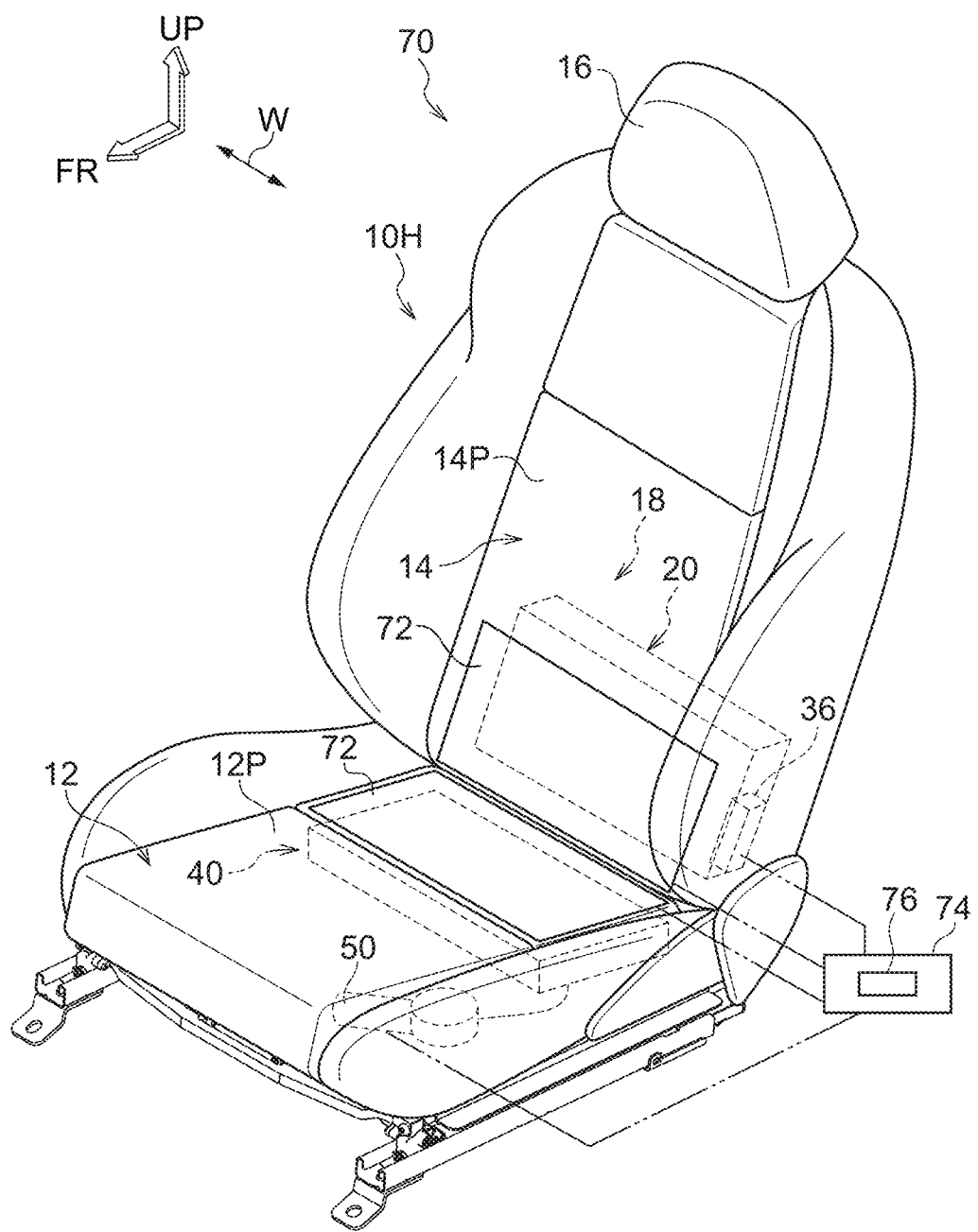
FIG. 19 is a perspective view illustrating a vehicle seat according to a second exemplary embodiment of the present disclosure.

Explanation follows regarding a vehicle seat according to a second exemplary embodiment of the present disclosure, with reference to FIG. 19. FIG. 19 is a perspective view illustrating a vehicle seat 70 according to the present exemplary embodiment. Note that the present exemplary embodiment has essentially the same configuration as that of the first exemplary embodiment, with the exception of the points described below. Accordingly, configuration sections that are essentially the same as those of the first exemplary embodiment are allocated the same reference numerals, and explanation thereof is omitted.

As illustrated in FIG. 19, the seat body 10H is provided with body pressure sensors 72 at locations corresponding to a range where the pelvis support 18 presses against the pelvis of a seated occupant (the lower back support 20 and the cushion support 40 are schematically illustrated in FIG. 19). The body pressure sensors 72 are electrically connected to an ECU 74 (illustrated in block form in FIG. 19). The ECU 74 is also electrically connected to the same external devices (encompassing the motors 36, 50) to which the ECU 60 (see FIG. 4A) of the first exemplary embodiment is electrically connected. Functional configuration of the ECU 74 includes a control section 76. Functional configuration of the control section 76 is implemented by the CPU reading and executing a program stored in the ROM or the storage.

Similarly to the control section 62 of the first exemplary embodiment (see FIG. 4A), in a state in which an occupant is sitting on the seat body 10H, the control section 76 controls the pelvis support 18 so as to alternate repeatedly between the pressing state and the non-pressing state. The control section 76 also controls the pelvis support 18 based on detection results from the body pressure sensors 72 so as to switch at preset timings between a first state in which the surface area of a location within a detection range of the body pressure sensors 72 where body pressure from the seated occupant P acts is a prescribed reference value or greater and a maximum value of the body pressure is no greater than a prescribed value (for example encompassing the state illustrated in FIG. 12B), and a second state that is different to the first state (for example encompassing the state illustrated in FIG. 12A).

An initial timing for switching to the first state is, as an example, similar to the timing of the first exemplary embodiment. As an example of the preset switching timings, the first state is initially adopted for 40 minutes, and for 15 minutes from the second time onward, whereas the second state is adopted for 15 minutes at a time. Note that as another example, an automatic regulation mode may be provided via an operation menu for the pelvis support 18 to enable configuration to repeat a pattern of switching the pelvis support 18 ON when the automatic regulation mode has been selected by an occupant, and then switching the pelvis support 18 OFF when the first state has been reached, and switching the pelvis support 18 ON again when the surface area of a location within the detection range of the body pressure sensors 72 where the body pressure of the seated occupant P acts has been deemed to have reached a minimum level.

The present exemplary embodiment prevents the body pressure distribution in the vicinity of the pelvis Pp of the seated occupant P from continuing in the same state for too long, and suppresses a reduction in the fatigue alleviation effect. Accordingly, the vehicle seat 70 of the present exemplary embodiment is capable of suppressing a reduction in the fatigue alleviation effect, even when remaining seated for a long time.

Supplementary Explanation of Exemplary Embodiments

In the first exemplary embodiment described above, the control section 62 illustrated in FIG. 4A and FIG. 4B controls the pelvis support 18 such that, as an example, the continuation duration of the pressing state initially after the occupant sits down is 40 minutes. However, as a modified example, a control section (62) may control the pelvis support 18 such that the continuation duration of the pressing state initially after the occupant sits down is anywhere between 35 minutes and 39 minutes, or between 41 minutes and 45 minutes.

As modified examples of the first and second exemplary embodiments described above, a (4-way) lumbar support enabling both front-rear direction and up-down direction adjustment may also be provided in parallel.

Configuration may also be made such that a projection amount of the pelvis support (pressing mechanism) when pressing the pelvis of the seated occupant can be set according to the individual preferences of the occupant.

Moreover, in the above exemplary embodiments the pelvis support 18 serving as the pressing mechanism is provided with both the lower back support 20 and the cushion support 40. However, the pressing mechanism may also be configured by only one support out of the lower back support (20) or the cushion support (40).

A vehicle seat may also be configured so as to allow an occupant to select functionality corresponding to only one support out of the lower back support (20) or the cushion support (40) as a pressing mechanism (in other words, to block the function of the other support as a pressing mechanism).

Note that the exemplary embodiments and modified examples described above may be implemented in appropriate combinations.

Although explanation has been given regarding an example of the present disclosure, the present disclosure is not limited by the above explanation, and obviously various other modifications may be implemented within a range not departing from the spirit of the present disclosure.

What is claimed is:

1. A vehicle seat comprising:
a seat body configured to seat an occupant;
a pressing mechanism that is provided at the seat body and is switchable between a pressing state, in which the pressing mechanism presses against a pelvis of a seated occupant, and a non-pressing state, in which the pressing mechanism does not press against the pelvis of the seated occupant; and
a control section configured to control the pressing mechanism, in a state in which an occupant is sitting on the seat body, so as to alternate repeatedly between the pressing state and the non-pressing state,
wherein the control section is configured to control the pressing mechanism such that an initial continuation duration of the pressing state from initially after an occupant sits down is from 35 minutes to 55 minutes, with the initial continuation duration being longer than a subsequent continuation duration of the pressing state from a second time onward after the occupant has sat down.

2. The vehicle seat of claim 1, wherein:
the seat body is provided with a body pressure sensor at a location corresponding to a range where the pressing mechanism presses against the pelvis of the seated occupant, and
the control section is configured to control the pressing mechanism based on a detection result from the body pressure sensor such that a first state is achieved during the pressing state in which a first surface area of a location within a detection range of the body pressure sensor where body pressure from the seated occupant acts is a prescribed reference value or greater and a first maximum value of the body pressure is no greater than a prescribed value, and a second state is achieved during the non-pressing state in which a second surface area of the location within the detection range of the body pressure sensor where the body pressure from the seated occupant acts is less than the prescribed reference value and a second maximum value of the body pressure is greater than the prescribed value.

* * * * *